United States Patent Office 2,904,526
Patented Sept. 15, 1959

2,904,526
COATING COMPOSITIONS

Heinz Uelzmann, Akron, Ohio, assignor to The B. F. Goodrich Company, New York, N.Y., a corporation of New York No Drawing. Application August 27, 1957
Serial No. 680,638

11 Claims. (Cl. 260—23)

The present invention relates generally to the production of improved coating compositions. More particularly, the invention relates to the aqueous dispersion or water-base type of coating composition and to compositions of this type which are capable of producing water-insoluble and alkali-resistant films and coatings. More particularly, the present invention relates to zinc-containing coatings of the latter type.

In the past few years water-base paints and coating compositions have found ready acceptance in the home-decorating field for interior use. The great ease of application of these materials has made them popular in spite of their acknowledged deficiencies as regards washability. The latter property, which most often is manifested as a poor resistance to alkaline soaps and cleansing agents, stems from the fact that most of these water-based paints employ an aqueous dispersion of a polymeric binder agent. For this latter application, latices of copolymers of styrene/butadiene (40–70 styrene and 30–60 butadiene) have been most common, although more lately latices of polyacrylic resins and other polyvinyl resin types have found considerable popularity. In these compositions the binder resin is present as pre-formed, discrete latex particles, the individual particles being nearly spherical in shape and associated with a layer of a dispersing agent. When a layer of such a coating composition is laid down on a surface the particles of binder resin do not coalesce, at least not completely, with the result that the pigment is imperfectly bound and consequently is quite easily washed off as compared with oil-based paints.

In addition, latex-based or dispersion-based aqueous coating compositions (hereinafter referred to as "water-base paints") require a number of highly hydrophylic additives. For example, one or more surface-active agents are usually required to maintain dispersion of the binder resin, still another as a suspending agent for pigment, and perhaps still another for good emulsion stability if there are additional dispersed oily or organic ingredients. Such hydrophylic additives remain in the dry paint film and render it sensitive to water and alkali. These substances, necessarily added to latex-containing water-base paints, have partially hindered their application in the field of exterior coatings.

In many applications it would be desirable if the paint formulator could incorporate zinc oxide into a water-base paint which will produce coatings resistant to discoloration by sulfur-containing fumes, coal smoke, and the like. While zinc oxide has been commonly employed for this purpose in oil-based paints, it has never been commonly used in water-base paints because of the powerful precipitating or de-stabilizing action of zinc oxide on binder latices present therein. Moreover, zinc oxide forms a very firm "cake" of sediment when it settles out of aqueous dispersion and the user may coagulate the binder latex in attempting to redisperse the firm zinc oxide containing sediment. As a result, zinc oxide has not been entirely desirable in water-base paints.

Thus, the field of water-base coating compositions has long been in need of a composition which can be laid down from water solution or water dispersion and which will air-dry or air-cure to a water-resistant and alkali-resistant film. This field also requires an improved agent for the suspension of pigments, one which places no reliance on water-sensitive materials. Such an agent is especially required to widen the field of application of zinc-containing pigments such as ZnO. No satisfactory coating composition meeting these requirements has been available to the paint and coatings industry.

In accordance with this invention, it has been found that an aqueous solution or solution/dispersion of a zinc-ammonia-polymer complex forms a film or coating which is highly insoluble after air drying for a short time at ordinary temperatures. Such coating is continuous and can be made in a range of softness and flexibility or hardness, as may be desired, by suitable variations in the manner of preparing the polymer portion. The aqueous dispersion or latex of zinc-ammonia-polymer complex has a large capacity to disperse or suspend finely-divided binder resins and inorganic and organic pigments, and the stability of the suspension is not affected by excess zinc oxide pigment. Most unusual, the excellent pigment-suspending power of the complex solution is obtained at the same or much lower viscosities than is obtained with conventional suspending agents, and without subsequent thickening or setting up of the composition on standing. These results are also obtained with no sacrifice in pigment loading capacity since the complex will efficiently suspend up to 85% pigment by weight of the composition. Zinc oxide, especially, seems to be especially well suspended in the compositions of this invention. Most important, however, is the insolubility of dried films and coatings of the composition.

The zinc-ammonia-polymer complex either can be present in sufficient proportion to serve as the sole pigment binder and film forming substance or it can be utilized in smaller proportion, in conjunction with other binder resins, as a pigment and binder suspension agent and coating insolubilizer. In the latter use, the zinc-ammonia-polymer complex is found to be compatible with most of the commonly-known binder resins used in water-based paints and coating compositions. This high compatibility is shown by the formation of substantially clear films on admixture with alkyd coating resins, phenolic coating resins, polyvinyl acetate, polyethyl acrylate, high styrene/butadiene copolymers and others. Films of this type range, from hard, glossy and sometimes brittle coatings to flexible, smooth coatings (depending to a large extent on binder resin properties). Moreover, the water-based coating compositions and paints containing the zinc-ammonia-polymer complex have great adhesive power and adhere well to such widely dissimilar surfaces as those of bonderized metal (steel), glass, wood, masonry, plaster, paper, textiles, rubbers, resins, and many others. Properly formulated compositions of this invention will produce coatings which do not loosen or peel even after prolonged immersion in water, aqueous sodium carbonate, or sodium stearate solutions. So strong is the attraction of the cured zinc dicarboxylate form of the polymer for "Bonderized" metals, especially "Bonderized" steel, that the clear and pigmented compositions of this invention are excellent primers and "wash primers" for use under exterior-grade alkyd, melamine/alkyd or urea/alkyd automotive enamels and lacquer finishes.

What has been termed herein a "zinc-ammonia-polymer complex" is the product formed when a low molecular weight, carboxyl-containing polymer is combined with aqueous ammonia and with a dissolved and/or dispersed divalent zinc compound of low solubility such as zinc oxide or $Zn(OH)_2$. The product formed may be a basic zinc-ammonium salt of the polymer. If solution or dispersion of the polymer can be achieved in water or aqueous ammonia, the ammonia and/or ammonia and zinc compound can be added to the pre-formed polymer solution or dispersion, usually with the latter showing a reduction of viscosity upon addition of the zinc compound. Usually, when working with a solid acidic polymer, the presence of the zinc compound and ammonia in the water facilitates the solution of the polymer and/or dispersion of the polymer salt. Polymers too high in carboxyl-content are not useful because either they do not form good films (too brittle) or because the viscosity of the aqueous composition is too high. Polymers too low in carboxyl, of course, generally can not be put into the aqueous phase. Likewise, polymers too high in molecular weight either can not be put into dispersion or form dispersions too high in viscosity.

When a polymer of the desired characteristics is added to aqueous ammonia containing a dispersed or partially dissolved divalent zinc compound, a very small amount of the polymer seems to pass into solution, react with the ammonia and dissolved zinc and then precipitate out of solution again as fine, latex-like colloidal particles of great stability under ammoniacal conditions. The successive steps of the process of dissolution-reaction-precipitation-dispersion progresses until a substantial dispersed solids content is built up. Solids contents as high as 40 to 60% by weight or more are sometimes obtainable in this fashion. Likewise, if ZnO or Zn(OH)$_2$ are added to a solution of polymer, the zinc slowly dissolves accompanied by precipitation and dispersion of the complex. Precipitation of a substantial proportion of the dissolved polymer is evidenced by reduction in viscosity, the dispersion or solution/dispersion usually being less viscous than a solution of the ammonium salt of the polymer of similar solids content. The dispersion or mixed solution-dispersion is milky-white in appearance. When laid down as a thin film or coating, the dispersion dries to form a continuous, hard, tough, often clear, and always water-insoluble film. Ammonia is given off, apparently during the drying step, as the zinc-ammonia-polymer complex breaks down forming a cross-linked polymer structure. It is not fully understood, but it is believed that the ammoniacal complex may contain the polymer basic zinc salt which on drying gives up ammonia and passes into the neutral zinc dicarboxylate type salt wherein a considerable number of

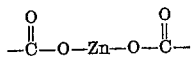

(zinc dicarboxylate) linkages are established between polymer chains. Such a dried, cross-linked polymer is highly insoluble in water and may be somewhat sensitive to aqueous alkaline solutions. The alkali-sensitivity of the air-dried coatings can be largely overcome by incorporating in the coating composition a dispersion of a water-insoluble (hydrophobic) binder resin as will be more fully described below.

As indicated above, only a somewhat narrow range of polymers form zinc-ammonia-polymer complexes suitable as film-forming materials. The most critical property of the desired polymer is a low molecular weight. Molecular weights of polymers, in most cases, are mere calculated values and are only of relative magnitude. For the purposes of this invention, the maximum usable polymer molecular weight can be expressed in the form of the viscosity of a standard 25% by weight aqueous solution of the ammonium salt, as such viscosity is determined by the Gardner-Holdt viscometer tubes at 25° C. A polymer exhibiting a Gardner-Holdt viscosity of about "Z–6," or lower as per above conditions, will be found to form dispersions of about the maximum usable viscosity. Generally, polymers evidencing viscosities less than this are more desirable since water-base paints and coating compositions are usually formulated to a lower final viscosity. There is no real lower limit for viscosity (i.e. molecular weight) providing that the polymer can be cured to form a continuous, coherent film of useful properties. It is obvious that monomers, dimers or other lower telomers, each molecule of which contains at least one carboxyl group, would be of little utility since such a material cures to a rigid, brittle, three-dimensioned network of little strength.

Any polymer of a monomeric mixture containing (1) an alkyl ester of arcrylic acid and (2) acrylic and/or methacrylic acid, wherein the alkyl acrylate predominates and the total polymerizable acid content comprises not less than about 3% by weight nor more than about 20% by weight, preferably 6 to 15% of the total, can be utilized. The polymer may be made from monomeric mixtures containing, in addition to the two specified ingredients, minor proportions (i.e. as a substitute for from about 2 up to about 10 or 15% by weight of the alkyl acrylate) of one or more other monomers providing such other monomers do not render the acrylate/acrylic acid type polymer excessively hydrophobic, cross-linked or otherwise completely insoluble in aqueous ammonia and/or aqueous zinc-ammonia solutions. Suitable monomers of the desired type, which have been found useful, are many of the acrylamides such as t-butyl acrylamide; other vinyl monomers such as vinyl acetate; vinyl pyridine; other unsaturated acids such as itaconic acid, crotonic acid, and others. Some of these additional monomers increase the hardness or toughness of the zinc-cured polymer film. Generally, however, it is preferred to utilize the copolymers (two-component polymers) prepared from an alkyl acrylate ester in which each alkyl group (alcohol residue) contains not more than about 3 carbon atoms. Methacrylic acid can be employed as an at least partial substitute (i.e. up to about 50% by weight) for the acrylic acid as may be itaconic acid, crotonic acid, and others. Generally, however, acrylic acid itself or a mixture of acrylic and methacrylic acids containing not more than about 50% by weight of the latter, are preferred. Copolymers of from about 85 to about 94% by weight of ethyl or methyl acrylate and from about 6 to about 15% by weight of acrylic acid are very easy to prepare and are preferred because they produce superior films and coatings in the compositions of this invention.

The polymers of the alkyl acrylate/acrylic acid type are best made, for use in this invention, by polymerization in aqueous emulsion in the presence of modifiers or chain transfer agents such as the organic mercaptans (sulfides), disulfides and polysulfides, alkyl xanthogenates, tetra-alkyl thiuram mono- and disulfides, mercapto-thiazoles, and many others. In some cases polymerization can be carried out in solution at elevated temperatures in solvents such as dioxane. Solvent/non-solvent systems can sometimes be used to obtain finely-granular products useful in this invention. Methods which involve the production of solid masses of polymer are not preferred because large quantities of energy are required to disperse such forms of resin. The aqueous emulsion system is preferred, however, because the resulting emulsion or latex of acid-form polymer can be added directly to aqueous ammonia or zinc-oxide/ammonia dispersion solutions with the production of clear solutions (in the case of the aqueous ammonia) or a latex in the case of the zinc-oxide/ammonia solution. If desired, the carboxylic polymer latex can be coagulated and the coagulum washed and dried to obtain a finely granular, easily-dissolved polymer useful in compositions of this invention.

If the polymer is granular, ball-milling in aqueous zinc/ammonia solutions, can be employed to put the polymer in the dissolved or dispersed state. Solution or dispersion of the polymer is much facilitated at a pH of 9 or 10 or higher. In general, the amount of ammonia present should be sufficient to put the polymer in solution, although complete neutralization is not required.

It is preferable, in order to obtain a truly water-insoluble final film, to neutralize at least 50% or more of the polymeric carboxylate groups. Complete neutralization may sometimes cause an increase in viscosity and, in other cases, a decrease in viscosity over that obtaining at 50 to 85% neutralization. It is desirable to utilize only ammonia or low-boiling simple amines as the neutralizing agent because fixed alkalis (NaOH, KOH, etc.) interfere with the curing reaction and remain in the film, increasing its water sensitivity.

When a divalent zinc compound, such as zinc oxide or zinc hydroxide, is added to an ammoniacal solution of one of the above-described polymers, a considerable reduction in viscosity occurs accompanied, usually, with indications that a portion of the zinc-ammonia-polymer complex (i.e. basic salt) has precipitated and been dispersed in the medium. The product seems to be a latex in which the particles of basic salt are very finely, and permanently, dispersed. The liquid phase has been found to contain, in some cases, a small amount of dissolved basic salt. Experiments have shown that the clear aqueous phase can contain up to about 0.5% by weight of dissolved $Zn(OH)_2 \cdot 6NH_3$ complex. This means that even quite highly concentrated dispersions of the basic salt can be employed without inordinate increase in viscosity. At the higher concentrations obtainable (i.e. above about 15% by wt.) the dispersion can serve the double function of pigment binder resin and pigment suspension agent. Concentrations of up to 25 to 40% by weight of the basic salt can be employed, as such, in the production of clear, unpigmented coating compositions. A very important use for lower concentrations is as a pigment suspension agent in a formulation containing another resin as the principal binder resin. For this latter use, amounts of between about 2 and about 25% by weight, based on the total weight of coating compositions, is suitable.

The coating composition of this invention can be made in a variety of ways but perhaps most convenient for the paint and coating industry is a procedure recommended for most types of water-base paints. The latter includes as a first step the preparation of an aqueous pigment paste containing all, or nearly all, of the dry pigments to be added. In the preparation of the paste, the dry pigments are combined with water and a small amount of a surface-active wetting agent and the mixture ball-milled until a smooth paste is obtained. The resulting paste is then diluted by addition of a dispersion of the zinc-ammonia-polymer complex, followed by addition of dispersions of other binder resins, if such are to be employed, dispersions of coloring agents and of antioxidants, stabilizers, curing agents, and others. Finally, after thorough intermixture brought about by gentle stirring, the final solids content and/or final viscosity may be adjusted by addition of water. Alternatively, all the ingredients, including the zinc compound, ammonia and polymer, but excluding the easily-coagulated latices of additional binder resins, can be ball-milled at one time and then the binder resin latex added to complete the formulation. Still another procedure is to combine a portion of the zinc oxide with the other dry pigments and disperse the resulting mixed powder in a dilute aqueous ammoniacal solution of polymer. An acceptable pigment paste can be obtained in this fashion if the proportion of polymer is kept low to limit the viscosity and permit efficient grinding. Other procedures and variations will readily occur to one skilled in the art.

Any proportion of pigment or filler may be incorporated, even up to as much as 85 to 100% by weight of the total weight of coating composition. High gravity pigments such as rutile $TiO_2$, zinc oxide, barytes, lithopone, litharge, calcium carbonate, magnesium oxide, kaolin, alumina, silica flatting agents, carborundum, finely ground mica, color pigments such as toluidene Red, organic coloring and/or masking agents and dyes, and many others may be employed. In addition, antioxidants, antifoam agents, fungicides, germicides, softeners, auxiliary emulsifiers, etc. may be added. The normal functions of these additives are not interfered with by the zinc-ammonia-polymer complex.

Binder resins employed, which may be incorporated in the coating composition of this invention (to improve alkali resistance), are either hydrophobic, per se, or are capable of air-curing to a hydrophobic, water-insoluble and alkali-resistant state. A wide variety of materials has these properties including the various dispersions or latices of alkyd coating resins including the oil-modified types; dispersions of alkali-stable phenol-formaldehyde, urea-formaldehyde resins, or melamine-formaldehyde resins; dispersions of polyacrylic type resins such as polyethyl acrylate, polymethyl acrylate, polyacrylonitrile and others; other vinyl-type resins such as dispersions of polyvinyl acetate, polyvinyl alcohol, vinyl chloride polymers such as vinyl chloride/alkyl acrylate copolymers, vinyl chloride/vinyl acetate copolymers, and vinyl chloride/vinylidene chloride/alkyl acrylate interpolymers; vinylidene chloride/acrylonitrile copolymers, and other vinyl resins; dispersions of the so-called "epoxy" coating resins; the resinous interpolymers of styrene/butadiene or styrene/butadiene/acrylonitrile predominating in styrene content; and many, many others. Polyalkyl acrylates, styrene/butadiene copolymers and alkyd coating resins are preferred.

The proportion of zinc oxide, or its equivalent, to be employed in forming the dispersion of the zinc-ammonia-polymer complex should be sufficient, on a molar basis, to convert at least about ¼ to ⅓ of the carboxyl groups in the polymer to the zinc dicarboxylate or neutral salt from [(moles C—COOH)/2÷¼) or moles (—COOH/ 2÷⅓)]. However, excess zinc oxide is not detrimental and the excess will be efficiently suspended as a pigment or filler along with other pigments during the grinding or ball-milling operation. A conventional proportion of zinc oxide, 2 to 25% by weight of the total weight of composition, usually will supply all the zinc needed for cross-linking. Total pigment contents up to 85% of the total compounds can be utilized, with up to 65% being preferred.

The invention will now be more fully described with reference to several detailed examples, which are intended as being illustrative only.

EXAMPLE 1

In this example a copolymer of a monomeric mixture of 89% by weight of ethyl acrylate, 5.5% acrylic acid and 5.5% of methacrylic acid is utilized. Such a copolymer is insoluble in water but is rather readily soluble in aqueous ammonia. Such a copolymer is prepared by agitating the following materials at 50° C. in a closed, evacuated vessel.

| Material: | Parts/wt. |
|---|---|
| Ethyl acrylate | 89.0 |
| Acrylic acid (glacial) | 5.5 |
| Methacrylic acid (as 20% sol in $H_2O$) | 5.5 |
| "Santomerse S"[1] (as 30% sol in $H_2O$) | 2.0 |
| "Daxad 11"[2] | 1.0 |
| 10% sulfuric acid, to pH of 4.0. | |
| $K_2S_2O_8$ | 0.2 |
| $H_2O$ | 150.0 |
| "Sulfole B-8"[3] | 0.5 |

[1] "Santomerse S," a commercial emulsifier said to be an aqueous solution containing about 30% by weight of sodium lauryl sulfate.
[2] "Daxad 11," a commercial emulsifier said to be a sodium salt of polymerized alkaryl sulfonic acids.
[3] t-Dodecyl mercaptan.

The product of this polymerization is an aqueous emulsion which is coagulated by the salt-acid method and the resultant crumbs washed free of acid, salt and emulsifiers and then dried at about 50° C. in a vacuum dryer. In a suitable case, the latex of acid form could be used directly in the preparation of the zinc/ammonia/complex. Upon analysis, the polymer is found to contain a total of 0.135 mole of carboxyl whereas the amount charged amounted to 0.140 mole. The dried polymer is insoluble in water. A mixture of 7 grams of the polymer, 2 grams of concentrated aqueous ammonia (25%), and 61 grams of water are ball-milled to form a low viscosity, clear solution. To the resulting solution there are added 2 grams of zinc oxide and the mixture again ball-milled. The final product is milky-white in appearance and somewhat less viscous than the original solution of the ammonium salt. When spread in a film on a glass plate, a clear, smooth, almost invisible film is deposited. The coating is not loosened or dissolved on prolonged soaking in water.

A pigmented coating composition is prepared from the above copolymer by combining 7 grams of the copolymer, 2 grams of 25% $NH_4OH$, 61 grams of water, 2 grams of ZnO and 15 grams of rutile $TiO_2$ pigment and ball-milling the resulting mixture for at least 24 hours. A smooth, milky dispersion is obtained having a total solids content of 27% by weight. The total dispersed dry solids is made up of about 29% by weight vehicle (copolymer) about 8% of ZnO, and about 63% by weight of $TiO_2$. Thus, just 2 grams of the copolymer when converted to the zinc-ammonia-polymer complex is capable of suspending and/or dissolving a total of 71% by weight, based on the total dispersed solids content, of $TiO_2$ and ZnO pigments. The compositions are completely stable when stored in sealed containers preventing escape of ammonia. When the pigmented composition is spread on glass, wood, paper, and steel surfaces, smooth coatings are formed on air drying which are tightly adherent and so hard that they can not be marked with the finger nail. The composition, even though less viscous than a conventional latex paint, has good covering power and fair brushability. Again, on extended soaking in water, none of the air-dried films are loosened.

Similar results are obtained when an equivalent amount of $Zn(OH)_2$ is substituted for the dry ZnO pigment utilized above.

EXAMPLE 2

Sufficient of the copolymer of Example 1 is dissolved in aqueous ammonia to form a 15% (by weight) solution of the ammonium salt. The resulting clear solution is utilized in the preparation of a latex-style water-base paint containing, as a vehicle, a mixture of about 3 parts by weight of a commercial alkyd resin ("Rezyl 750-17") and about one part by weight of the ethyl acrylate/acrylic acid-methacrylic acid copolymer. First, 80 grams of the 15% solution (containing about 12 grams of copolymer) are mixed with $Zn(OH)_2$, $TiO_2$ and water according to the recipe:

| Material: | Parts/wt. |
|---|---|
| Copolymer, Ex. 1 | 12 |
| Water | 68 |
| $Zn(OH)_2$ | 4 |
| $TiO_2$ | 20 |

After 20 hours on the roller mill, the mixture is a smooth, milky dispersion. Considerable foam is generated during the pigment grinding operation.

A commercial air-drying tall-oil type of alkyd coating resin known as "Rezyl 750-17" is dissolved in sufficient solvent naphtha to make a fluid 50% solids solution. The resulting solution, containing a total of 30 grams of resin, is added directly to 42 grams of the zinc-ammonia-polymer solution (containing about 5 grams of the copolymer) and the mixture agitated by good stirring. Again, foaming occurs so 8 cc. of isopropanol are added and the agitation continued until the alkyd solution is effectively dispersed. On standing, no separation of suspended and dispersed materials is observed. Summarized below is the overall composition of this mixture:

Composition of the paint

| Material | Parts/weight | Percent/weight |
|---|---|---|
| Copolymer | [1] 5 | [1] 6.2 |
| Water | 28 | 34 |
| $Zn(OH)_2$ | 1.7 | .2 |
| $TiO_2$ | 8.3 | 10 |
| "Rezyl 750-17" | 30.0 | 37.5 |
| Isopropanol | 8.0 | 10 |

[1] Estimated.

Composition of vehicle: Percent/wt.
    Copolymer _____ 25
    Alkyd _____ 75

Total solids content=37%.

Composition of dry paint film: Percent
    Copolymer _____ 16.6
    Alkyd _____ 50.0
    $Zn(OH)_2$ _____ [1] 5.0
    $TiO_2$ _____ 27.6

[1] Estimated.

Application of the above latex-type water-base paint to the surfaces of glass, wood, steel, brass, and concrete and plaster-type masonry produces an excellent-appearing coating of good covering power and free of brush marks. After air-drying at indoor temperatures for 24 hours, the coatings are hard and dust-free, strongly adherent, and no pigment can be rubbed off on repeated rubbing with a dark wool suiting material. Likewise, after several days soaking in water the coatings on glass retain their adhesion. Adhesion and cohesiveness of the coatings on glass are maintained after several days soaking in a standard soap solution (sodium stearate).

EXAMPLE 3

In this case a copolymer of 90% by weight of ethyl acrylate and 10% of acrylic acid is prepared by emulsion polymerization for 2 days at 50° C. according to the following recipe:

| Material: | Parts/wt. |
|---|---|
| Ethyl acrylate | 90 |
| Acrylic acid (glacial) | 10 |
| "Santomerse S" [1] | 6 |
| "Daxad 11" [1] | 1 |
| $H_2SO_4$ (to pH 1 to 4), cc. | 0.5 |
| $K_2S_2O_8$ | 0.5 |
| "Sulfole B-8" [1], cc. | 0.8 |
| $H_2O$ | 120 |

[1] See Example 1.

The product is a latex which is creamed by addition of NaCl and then coagulated by addition of $H_2SO_4$. The coagulum is then washed until salt- and acid-free and dried in a vacuum oven at 50° C. The dry polymer is rubber-like and seems quite tough, obviously being slightly higher in molecular weight than the copolymer of Example 1. A 100 gram quantity of the dry copolymer is mixed with 23 grams of 27% $NH_4OH$ and 543 grams of water and then ground on a paint roller with steel balls for 18 hours. A clear solution is obtained having a Gardner-Holdt viscosity of V to Y. To 410 grams of this solution there are added 18 grams of ZnO and the mixture again ground with steel balls on the paint roller. A smooth, slightly milky dispersion is obtained which is lower in viscosity than the original solution of the ammonium salt. The dispersion has excellent film-forming properties, the air-dried films produced having a hard surface. The dried coatings develop good adhesion to glass, wood, cement and plaster. Soaking in water somewhat reduces the adhesion to glass but the coating regains full adhesion and hardness on drying again. On the other surfaces, adhesion is not impaired by water soaking. The overall composition of this paint is as follows:

| Material: | Percent/wt. |
|---|---|
| Copolymer | 14.4 |
| $H_2O+NH_3$ | 81.4 |
| ZnO | 4.2 |
| | 100.0 |

This dispersion is then utilized to prepare an excellent paint employing a combination of ZnO, red iron oxide, and $TiO_2$ pigments.

EXAMPLE 4

A copolymer of 80% ethyl acrylate and 20% acrylic acid made as described in Examples 1 and 3 (containing 0.265 mol percent of acid) is converted to a dispersion by grinding the following materials on a paint roller using steel balls:

| | Grams |
|---|---|
| Copolymer | 17 |
| $NH_4OH$ (25–27%) | 2 |
| $H_2O$ | 88 |
| $Zn(OH)_2$ | 5 |

The product is definitely more viscous than the corresponding solutions of polymers lower in acid content (a 25% solution of this polymer has a viscosity of about "Z," Gardner-Holdt). Air-dried films (on glass) are very hard, somewhat brittle and have good adhesion when dry. Soaking in water for prolonged periods loosens the coating somewhat. Apparently a 20% acid copolymer contains about as much acid as can be tolerated from the standpoint of water sensitivity, good film properties and usable viscosity characteristics.

EXAMPLE 5

A series of copolymers of maleic anhydride and methyl vinyl ether of various molecular weights are prepared by polymerization in benzene. Such materials are obtained as fine granules which are soluble in aqueous ammonia forming more or less viscous solutions. Conversion of the latter to a zinc complex by adding ZnO forms, in some cases, smooth dispersions. However, irrespective of molecular weight the coating compositions had bad brushability. All compositions were so viscous as to lead one to suspect that even the solution formed from the lowest molecular weight were more or less cross-linked. In all cases brittle, cracked, air-dried films are obtained.

EXAMPLE 6

In this example, a copolymer of 92% ethyl acrylate and 8% acrylic acid is prepared by polymerization to 98% conversion by the method of Example 1 and the latex obtained then precipitated with $H_2SO_4$. A 25% solution of such a polymer in aqueous ammonia has a Gardner-Holdt viscosity of about Z–6. Such a solution is formulated into green and blue paints, according to the recipes:

| | Green paint | Blue paint |
|---|---|---|
| Copolymer | 25 | 25 |
| ZnO | 1.6 | 1.6 |
| Water | 64 | 64 |
| $NH_4OH$ (conc.) | 4 | 4 |
| $TiO_2$ | 35 | 35 |
| Phthalocyanine green | 4 | |
| Phthalocyanine blue or ultramarine blue | | 4 |

The resulting paints, after grinding for 24 hours, are smooth and exceedingly stable. Their viscosities are about 75 Krebs units (K.U. 75). Such paints form water-insoluble coatings upon simple air drying. Similar paints can be prepared by substituting lithopone for the $TiO_2$ employed above, and adding a small amount of red pigment pyrazolone. Again the dispersion is excellent, stability good, and the air-dried films are water-insoluble.

EXAMPLE 7

A copolymer similar to that of Example 6 is made in the same fashion and having a molecular weight as indicated by the viscosity of a 25% ammoniacal solution of "Z–2" Gardner-Holdt or (36 poises) as compared to the "Z–6" viscosity of the ammoniacal solution of Example 6. A 20% solution of the copolymer of this example has a Gardner-Holdt viscosity of "A" while a 30% solution has a viscosity of "Z–6" viscosity (148 poises). When converted to a water-base paint similar to those of Example 6, the viscosity is about the same. Excellent water-insoluble films and coatings are produced therefrom on glass, wood and bonderized steel.

EXAMPLE 8

A copolymer of a mixture of 92% methyl acrylate and 8% of acrylic acid is polymerized at 50° C. for 22 hours. The polymer latex is worked up as in the previous examples to obtain a strong, clear and rubber-like polymer. A 20% solution of the copolymer in aqueous ammonia is easily prepared by grinding the following materials:

| | Grams |
|---|---|
| Copolymer | 20 |
| $NH_4OH$ (conc.) | 3.5 |
| Water | 76.5 |

The viscosity of the resulting solution is high, it being almost 148 poises or "Z–6" Gardner-Holdt. Converted to a zinc-ammonia-polymer complex, by the procedure similar to that described in the preceding examples, an excellent dispersion of zinc carboxylate is obtained. Air dried films prepared from such a dispersion are water-insoluble, quite tough and are strongly adherent to glass, wood, bonderized steel, concrete masonry and plaster board. Similar results are obtained using a copolymer made from a mixture of 69% methyl acrylate, 23% ethyl acrylate and 8% acrylic acid.

EXAMPLE 9

An interpolymer of a mixture of 46 grams of ethyl acrylate, 46 grams of vinyl acetate, and 8 grams of acrylic acid is prepared by polymerization in aqueous emulsion (recipe similar to that of Example 1) at 50° C. in a nitrogen-purged reactor. The dispersion is coagulated with NaCl to obtain a solid polymer which, when dried, is strong and elastic. Thirty grams of wet polymer, 5 grams of concentrated $NH_4OH$ and 65 grams of water are ground to produce a clear solution containing 21.4% solids and having a Gardner-Holdt viscosity of "V." One hundred grams of the described ammonia salt solution are then ground with 1.8 grams of ZnO (sufficient for basic salt). The viscosity of the resulting dispersion is somewhat lower. Air-dried films cast from this dispersion are smooth, clear, and insoluble in water and have excellent adhesion to glass. Similar results are obtained when vinyl butyrate is substituted for the vinyl acetate of Example 9.

EXAMPLE 10

A tripolymer of ethyl acrylate, t-butyl acrylamide, and acrylic acid is prepared by polymerization at 50° C. in aqueous emulsion employing the recipe:

| | | |
|---|---|---|
| Ethyl acrylate | grams | 82 |
| t-Butyl acrylamide | do | 10 |
| Acrylic acid | do | 8 |
| "Santomerse S" (30%) | cc | 6 |
| "Tamol N"[1] | gram | 1 |
| $K_2S_2O_8$ | do | 0.5 |
| $H_2SO_4$ (10%) | cc | 0.5 |
| Sulfole B–8 | cc | 0.8 |
| Water | cc | 100 |

[1] An emulsifier.

The polymerization proceeds to a conversion of 95%. The resulting dispersion is coagulated, the coagulum washed and then dried. A mixture of 20 grams of dry polymer, 3.5 grams of concentrated NH$_4$OH and 76.5 grams of water is ground to form a clear solution having a Gardner-Holdt viscosity of "Y" to "Z." Grinding with sufficient zinc oxide to form the basic salt produces a smooth dispersion which forms water-insoluble films on wood, glass, paper and bonderized steel.

EXAMPLE 11

The procedure of Example 10 is repeated except that a mixture of 69 grams of ethyl acrylate, 23 grams styrene, and 8 grams acrylic acid is substituted for those of the example. The mixture polymerizes overnight to essentially complete conversion. Isolation of the dry polymer reveals that it is tough in nature. A 20% solution in aqueous ammonia exhibits a viscosity of "Z" to "Z–1," Gardner-Holdt. A mixture of 100 grams of the 20% solution is ground with 0.9 gram of ZnO. A smooth dispersion is obtained having essentially the same viscosity as that of the ammonia salt solution. The dispersion forms water-insoluble, hard films on glass, wood, and metals.

EXAMPLE 12

A tripolymer similar to that of Example 10 is prepared using a mixture of 77% by weight of ethyl acrylate, 14 grams of t-butylacrylamide), and 9 grams of acrylic acid. The dried polymer obtained from a polymerization conducted to 95% conversion is clear, elastic, soft but quite tough. A 20% by weight solution of the dry polymer in aqueous ammonia has a Gardner viscosity of "Y"; a 25% solution has a viscosity of "Z–6"; a 30% solution is a paste but the polymer is nevertheless completely dissolved; and an attempt at the production of a 40% solution produces a paste in which it appeared only ⅘ of the polymer dissolved. With these ammonia solutions, sufficient zinc oxide for basic salt formation is ground in a ball mill. Excellent dispersions are obtained, even with the 40% paste. All the resulting dispersions are less viscous. All form excellent water-insoluble films. The same results are obtained using the solid, carboxylic polymer, water, ammonia, and ZnO and grinding; dispersions of up to 40% solids can be produced in this way in one step.

A paint is prepared by grinding 100 grams of the above-described 25% solution, 2 grams of zinc oxide, 25 grams of TiO$_2$, and 5 grams of Fe$_2$O$_3$. The resulting paint exhibits excellent adhesion for wood. The coating on wood is completely insoluble in water.

EXAMPLE 13

A drying oil (oiticica oil) modified with a phenolic resin (trade name "Beccacite") is made up as 50% solution in xylene. The resulting solution is dispersed in a ZnO/NH$_4$OH solution containing about 25% total solids (i.e. about 22% polymer) prepared from a 92 ethyl acrylate/8 acrylic acid copolymer (similar to that of Example 6). A small amount of "Santomerse S" (see Example 1) is added to stabilize the dispersion. Various dispersions of this type are prepared in which the ratio of polymer/vehicle is 1:2; 1:1 and 2:1. The resulting dispersions are cast as films and the latter dried either at room temperature, at 50° C. or at 100° C. Water-insoluble films on glass are produced, irrespective of drying conditions. These films are tested for alkali sensitivity in 1, 2, 3, and 4% sodium carbonate solutions at 23° C. for 6 hours. As compared to control films prepared without the drying oil, the experimental films are considerably better in alkali resistance. These tests indicate indoor paint formulations made in this fashion will withstand repeated washings with the most alkaline of the household type cleansers.

EXAMPLE 14

A coating composition having excellent stability and capable of producing clear, alkali-resistant films and coatings is produced by blending a commercially available latex or dispersion ("Rhoplex AC33") (mainly containing polyethyl acrylate) with a ZnO-ammonia complex of a 92 ethyl acrylate/8 acrylic acid copolymer similar to that of Example 14. A 20% by weight solution of the complex is blended in proportions (copolymer:latex vehicle) of 1:2, 1:1 and 2:1. An excellent stable dispersion is readily obtained in each case. No settling can be observed after long standing. Except for emulsifier residues which may be present in the "Rhoplex" latex, no added emulsifiers or dispersing agents are required. Films and coatings cast from such compositions are clear and almost free from haze. The coatings on glass and wood are water-insoluble and retain their cohesiveness and adhesion even after about 6 hours' immersion in 1 or 2% sodium carbonate solution. Similar results are obtained on immersion in sodium stearate solutions.

EXAMPLE 15

The procedure of Example 14 is repeated using, as a replacement for the "Rhoplex" latex of the previous example, latices of commercially-available, oil-resistant, synthetic rubbers known as "Hycar OR." Such rubbers are made by polymerization in aqueous emulsion of monomeric mixtures containing from about 55 to about 85% by weight butadiene and from about 15 to about 45% of acrylonitrile. The 92 ethyl acrylate/8 acid copolymer, in the form of the basic zinc/ammonia salt, is blended with the "Hycar" latex in proportions of 1:2, 1:1 and 2:1. No auxiliary suspending or dispersing agents are utilized, yet a stable dispersion is obtained. A considerable increase in alkali resistance (5% sodium stearate or 2% sodium carbonate solutions) is obtained in all cases. The alkali resistance is highest, in the series, when the "Hycar":copolymer ratio is 2:1.

Similar results are obtained when a vinyl chloride/vinylidene chloride/ethylhexyl acrylate tripolymer latex known as "Geon 450x–3" or a polyvinyl acetate latex known as "Geon 970x–11" is substituted for the "Hycar" latex on an equivalent latex solids basis.

I claim:

1. A coating composition comprising, dispersed in water, at least 2% by weight of a zinc-ammonia-polymer complex formed by combining (1) aqueous ammonia, (2) a divalent zinc compound soluble in the former and selected from the class consisting of zinc oxide and zinc hydroxide, and (3) an interpolymer of a monomeric mixture comprising from about 80 to about 97% of an alkyl ester of acrylic acid in which each alcohol residue contains from 1 to 3 carbon atoms and from about 3 to about 20% of acrylic acid, said interpolymer having a molecular weight such that the viscosity of an aqueous ammoniacal solution containing 25% total polymer solids is not more than about "Z–6," as measured by means of the Gardner-Holdt viscometer tubes at room temperature.

2. A composition as defined in claim 1 containing, in addition, an effective amount of pigment dispersed therein.

3. An aqueous coating composition comprising an aqueous medium containing in dispersed form (1) from about 2 to about 40% by weight of a dispersed zinc-ammonia polymer complex formed by combining (a) aqueous ammonia, (b) a divalent zinc compound soluble in the latter and selected from the class consisting of ZnO and Zn(OH)$_2$, and (c) an interpolymer of from about 80 to about 97% by weight of an alkyl acrylate, in which each alcohol residue contains from 1 to 3 carbon atoms, and from about 3 to about 20% by weight of acrylic acid, said interpolymer having a molecular weight such that a 25% by weight solution thereof in aqueous ammonia exhibits a viscosity not greater than about "Z-6," as determined by the Gardner-Holdt tubes, and (2) from about 5 to about 40% by weight of a dispersed form of a hydrophobic binder resin material.

4. A composition as defined in claim 3 wherein an effective amount of pigment is dispersed therein.

5. A composition as defined in claim 3 wherein the said zinc compound is zinc oxide and the said interpolymer is a copolymer made from a monomeric mixture consisting of from about 85 to about 94% by weight of ethyl acrylate and from about 6 to about 15% by weight of acrylic acid.

6. A composition as defined in claim 3 wherein the said zinc compound is zinc oxide and the said interpolymer is prepared by the polymerization of a mixture of from about 65 to about 85% by weight ethyl acrylate, 2 to 15% by weight of t-butyl acrylamide, and from about 6 to about 15% by weight of acrylic acid.

7. A coating composition as defined in claim 3 wherein the said zinc compound is zinc oxide and the said binder resin is an alkyd coating resin.

8. A coating composition as defined in claim 3 wherein the said zinc compound is zinc oxide and the said binder resin is a polymerized alkyl acrylate.

9. A coating composition as defined in claim 3 wherein the said zinc compound is zinc oxide and the said binder material is a copolymer of from about 55 to about 85% by weight of butadiene-1,3 and from about 15 to about 45% by weight of acrylonitrile.

10. A coating composition as defined in claim 3 wherein the said zinc compound is zinc oxide and the said binder material is a drying oil.

11. A coating composition as defined in claim 3 wherein the said zinc compound is zinc oxide and the said binder material comprises polyethyl acrylate.

References Cited in the file of this patent

UNITED STATES PATENTS

| | | |
|---|---|---|
| 2,275,991 | Powers et al. | Mar. 10, 1942 |
| 2,506,892 | Radley et al. | May 9, 1950 |
| 2,649,439 | Brown | Aug. 18, 1953 |
| 2,681,327 | Brown | June 15, 1954 |

OTHER REFERENCES

Paint, Oil & Chemical Review, Investigation of Aqueous Acrysol, Geon & Saran Dispersions, pp. 50–6, Nov. 14, 1946.

Drubel: Official Digest, Zinc Oxide in Latex Paints, pp. 643–5, September 1953.

Paint Manufacturing, pp. 224–6, vol. 26 (1955).